United States Patent
Noda

(10) Patent No.: US 7,382,635 B2
(45) Date of Patent: Jun. 3, 2008

(54) POWER SUPPLY APPARATUS, METHOD OF CONTROLLING THE APPARATUS, AND ELECTRONIC DEVICE USING THE APPARATUS

(75) Inventor: Masaaki Noda, Gifu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 147 days.

(21) Appl. No.: 11/519,799

(22) Filed: Sep. 13, 2006

(65) Prior Publication Data
US 2007/0057659 A1 Mar. 15, 2007

(30) Foreign Application Priority Data
Sep. 14, 2005 (JP) ............................. 2005-266536

(51) Int. Cl.
*H02M 3/18* (2006.01)
*G05F 1/56* (2006.01)

(52) U.S. Cl. .................. 363/60; 307/110; 327/536

(58) Field of Classification Search .................. 363/59, 363/60; 323/225, 266, 268, 271, 272; 307/110; 327/536
See application file for complete search history.

(56) References Cited

U.S. PATENT DOCUMENTS 6,411,531 B1 6/2002 Nork et al.
6,738,272 B2 * 5/2004 Yamanaka et al. ............ 363/60

FOREIGN PATENT DOCUMENTS

JP 2002-291172 10/2002

OTHER PUBLICATIONS

Chinese Office Action issued Sep. 14, 2007 in Chinese application 200610151834.8 which is a foreign counterpart to the present application (with English translation).
"The construction and Operation of Voltage Regulation in Charge Pumps", published 2002 and English translation.

* cited by examiner

*Primary Examiner*—Gary L Laxton
(74) *Attorney, Agent, or Firm*—Wenderoth, Lind & Ponack, L.L.P.

(57) ABSTRACT

A power supply apparatus includes an input terminal to be connected to a DC power supply, a DC-DC converter connected to the input terminal, a first capacitor, a second capacitor, an output terminal, a first switch connected between an output port of the DC-DC converter to charge the first capacitor, a second switch connected between the first capacitor and the output terminal to discharge the first capacitor, a third switch connected between the output port of the DC-DC converter and the second capacitor to charge the second capacitor, a fourth switch connected between the second capacitor and the output terminal to discharge the second capacitor, and a switch controller. The switch controller is operable to charge the first capacitor and the second capacitor alternately charged, discharge the first capacitor and the second capacitor alternately, and prevent the output port of the DC-DC converter from being connected to the first output terminal. This power supply apparatus has a small power consumption, and does not generate noises.

12 Claims, 9 Drawing Sheets

US 7,382,635 B2

POWER SUPPLY APPARATUS, METHOD OF CONTROLLING THE APPARATUS, AND ELECTRONIC DEVICE USING THE APPARATUS

FIELD OF THE INVENTION

The present invention relates to a power supply apparatus and a method of controlling the apparatus, and to an electronic device using the apparatus.

BACKGROUND OF THE INVENTION

FIG. 9 is a circuit block diagram of conventional power supply apparatus 3 and electronic device 2 disclosed in Japanese Patent Laid-Open Publication No. 2002-291172. Battery 1 outputs a voltage ranging from 3.0V to 4.2V. A negative electrode of battery 1 is connected to a ground, and a positive electrode of battery 1 is connected to mobile phone 2, an electronic device, and input terminal 4 of power supply apparatus 3.

Integrated circuits (ICs) used for the electronic device having fine patterns have a small power source voltage ranging from 1.2V to 1.8V. In order to supply the voltage, power supply apparatus 3 converts an output voltage of battery 1 into the voltage ranging from 1.2V to 1.8V. A large current flows in mobile phone 2, and accordingly adds a ripple to a power source applied to input terminal 4. Power supply apparatus 3 removes the ripple in order to supply a power source to a circuit, such as an analog circuit, which is easily influenced by the ripple.

Power supply apparatus 3 includes DC-DC converter 5 for converting a power source voltage applied to input terminal 4 to a voltage of 1.2V, output terminal 6 connected to an output of DC-DC converter 5, regulator 7 for converting the power source voltage applied to input terminal 4 to a voltage of 1.2V, filter 8 connected to an output of regulator 7 to remove a ripple in the output, output terminal 9 connected to an output of filter 8, regulator 10 for converting the power source voltage applied to input terminal 4 to a voltage of 1.8V or 2.8V, and output terminal 11 connected to an output of regulator 10. Filter 8 further removes a ripple that has not been removed by regulator 7, and supplies a more stable voltage to output terminal 9.

Output terminal 9 is connected with analog circuit 13 that is influenced most easily by noises. Output terminal 11 is connected with high-frequency circuit 14 that is influenced next most easily by the noises. Output terminal 6 is connected with logic circuit 12 that is not relatively influenced by the noises.

DC-DC converter 5 converts a voltage, and simultaneously generates high-frequency noises. However, DC-DC converter 5 has a high conversion efficiency, and supplies a power source preferably to logic circuit 12 that is not relatively influenced by the noises, thus reducing a power consumption.

Analog circuit 13 and high-frequency circuit 14 are influenced easily by the noises, and regulators 7 and 10 that do not generate noises supply a power source to circuits 13 and 14. Analog circuit 13 is influenced by the noises, and filter 8 reduces the noises.

Conventional power supply apparatus 3 includes regulators 7 and 10 having high power consumption, thus not being suitable for reducing power. In FIG. 10, battery 1 outputs a voltage of 3.6V. A current of 20 mA flows in regulator 7 and analog circuit 13. A voltage of 1.2V is applied to analog circuit 13. Regulator 7 has an input port and an output port which have a potential difference of 2.4V(=3.6V−1.2V) between the ports. Analog circuit 13 consumes a power of 24 mW while regulator 7 itself consumes a power of 48 mW, which is larger than the power consumed by analog circuit 13.

SUMMARY OF THE INVENTION

A power supply apparatus includes an input terminal to be connected to a DC power supply, a DC-DC converter connected to the input terminal, a first capacitor, a second capacitor, an output terminal, a first switch connected between an output port of the DC-DC converter to charge the first capacitor, a second switch connected between the first capacitor and the output terminal to discharge the first capacitor, a third switch connected between the output port of the DC-DC converter and the second capacitor to charge the second capacitor, a fourth switch connected between the second capacitor and the output terminal to discharge the second capacitor, and a switch controller. The switch controller is operable to charge the first capacitor and the second capacitor alternately charged, discharge the first capacitor and the second capacitor alternately, and prevent the output port of the DC-DC converter from being connected to the first output terminal.

This power supply apparatus has a small power consumption, and does not generate noises.

DETAIL DESCRIPTION OF THE PREFERRED EMBODIMENTS

Exemplary Embodiment 1

Figure 1:
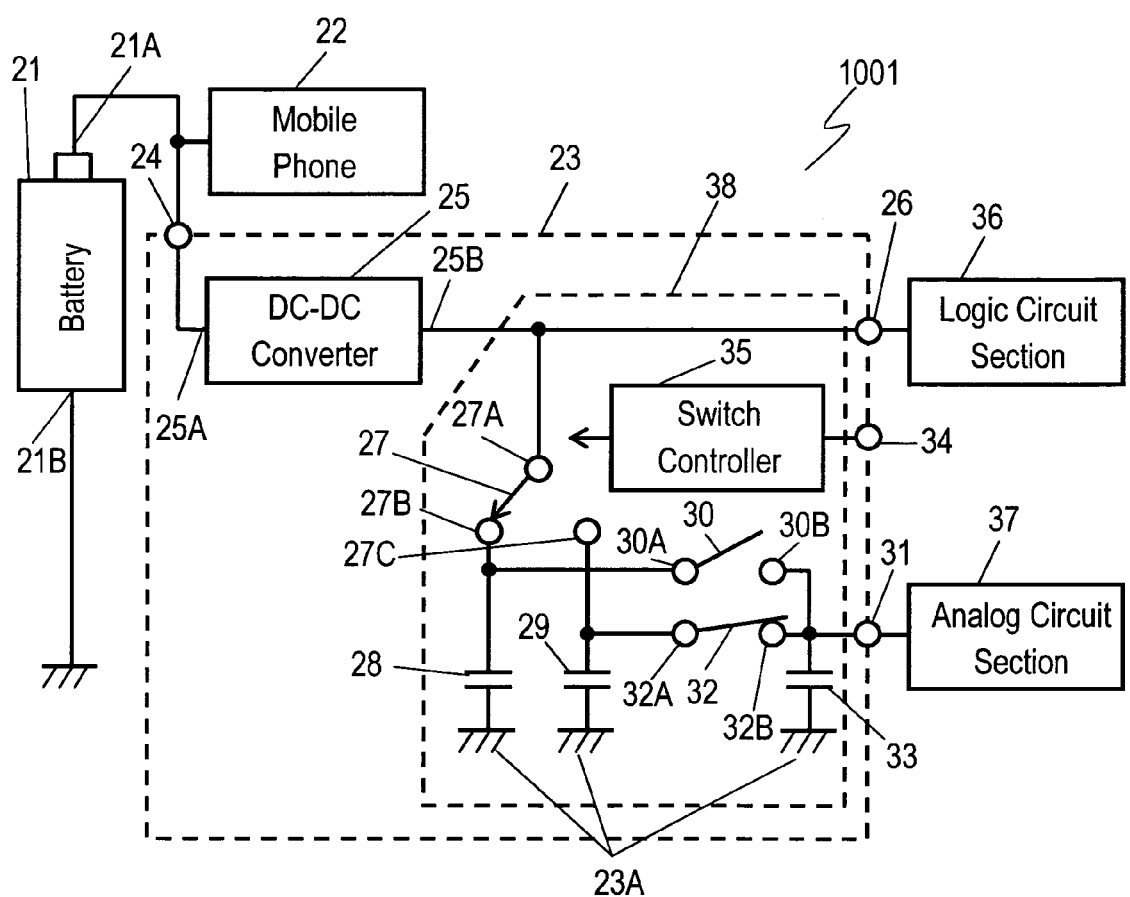
FIG. 1 is a circuit block diagram of a power supply apparatus according to Exemplary Embodiment 1 of the present invention.

FIG. 1 is a circuit block diagram of electronic device 1001 including power supply apparatus 23 according to Exemplary Embodiment 1 of the present invention. Battery 21, a direct-current (DC) power supply, has an internal resistor, and outputs a voltage of 3.6V. Positive electrode 21B of battery 21 is connected to ground 1001A, and negative electrode 21A of the battery is connected to mobile phone 22 and input terminal 24 of power supply apparatus 23.

Electronic device 1001 includes battery 21, mobile phone 22, power supply apparatus 23, logic circuit section 36, and analog circuit section 37. Power supply apparatus 23 includes output terminals 26 and 31 that are connected to logic circuit section 36 and analog circuit section 37, respectively to supply power sources.

Power supply apparatus 23 includes input terminal 24 and DC-DC converter 25. Input terminal 24 is connected to input port 25A of DC-DC converter 25. Logic circuit section 36 and analog circuit section 37 are composed of integrated circuits (ICs). The ICs have fine patterns, and operates while low voltages of 1.2V are supplied to the ICs. DC-DC converter 25 includes a switching power supply that converts a voltage of 3.6V applied to input port 25A to the voltage of 1.2V to output the converted voltage from output port 25B. The switching power supply operates at a switching frequency of about 400 kHz.

Output port 25B of DC-DC converter 25 is connected directly to output terminal 26 and is connected to common port 27A of branching switch 27. Capacitor 29 is connected between port 27B of branching switch 27 and ground 23A. Capacitor 29 is connected between port 27C of branching switch 27 and ground 23A. Branching switch 27 connects common port 27A selectively to ports 27B and 27C. Branching switch 27 may be composed of an electronic circuit. Each of capacitors 28 and 29 has a capacitance of 100 µF. This capacitance is determined in the following manner.

Voltage V is applied to capacitors 28 and 29 having capacitance C, and electric charge Q is accumulated in each of capacitors 28 and 29, the following equation is established.

$$Q = C \cdot V$$

Both sides are subjected to differentiation, and current I flowing in each of capacitors 28 and 29 is shown below.

$$I = dQ/dt = C \cdot dV/dt$$

Allowable drop voltage dV is assumed to be 0.1V, current I is 20 mA, and the period dt of time is 0.5 ms, then the following equation is established.

$$C = (I \cdot dt)/dV = (20 \times 0.0005)/0.1 = 100 \text{ µF}$$

Port 27B of branching switch 27 is connected port 30A of switch 30. Port 30B of switch 30 is connected to output terminal 31. Switch 30 connects and disconnects between ports 30A and 30B. Port 27C of branching switch 27 is connected to port 32A of switch 32. Port 32B of switch 32 is connected to output terminal 31. Switch 32 connects and disconnects between ports 32A and 32B. Switches 30 and 32 are composed of electronic switches. Capacitor 33 is connected between output terminal 31 and ground 23A. Capacitor 33 has a capacitance smaller than that of each of capacitors 28 and 29.

Control-signal-input terminal 34 to which a control signal having an on-time/off-time (duty) ratio of substantially 50% and is connected to switch controller 35. Switch controller 35 has an output connected to branching switch 27 and control terminals of switches 30 and 32 and controls the turning on and off of switches 27, 30, and 32. Switch controller 35 controls branching switch 27 to charge capacitors 28 and 29 alternately, and controls switches 30 and 32 to discharge the electric charge stored in capacitors 28 and 29 alternately.

Figure 9:
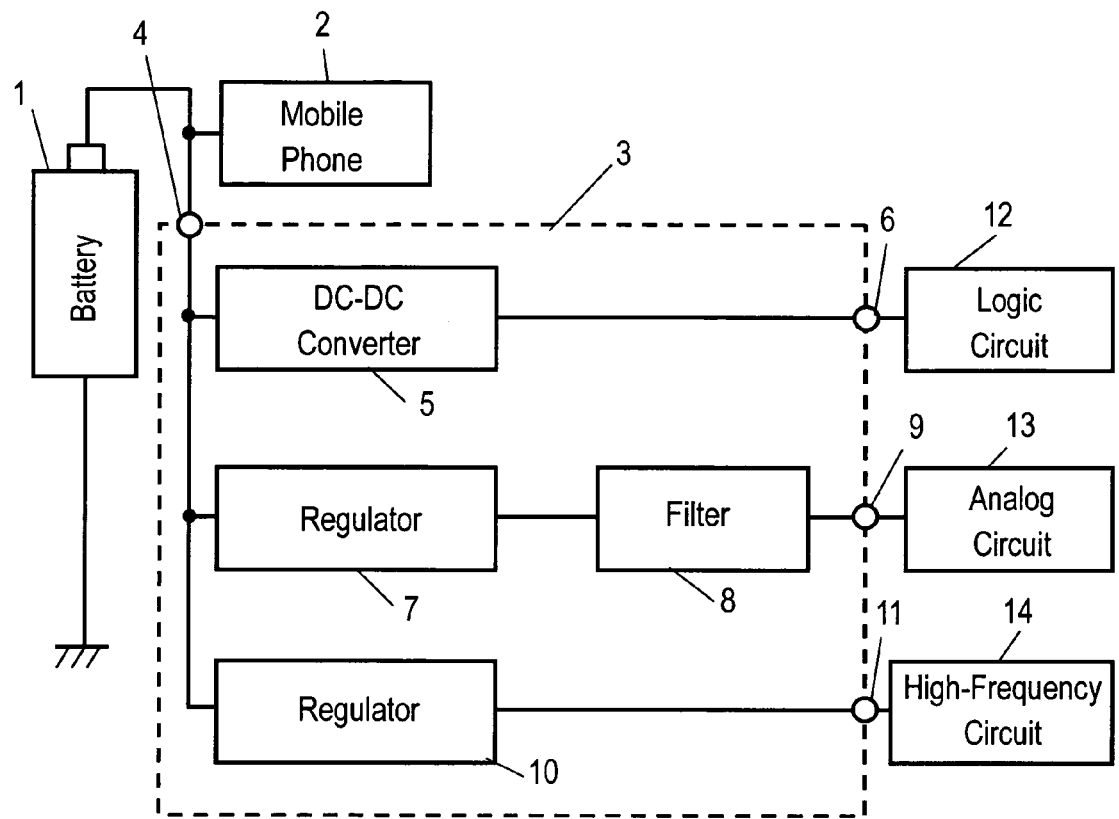
FIG. 9 is a circuit block diagram of a conventional power supply apparatus.
Figure 10:
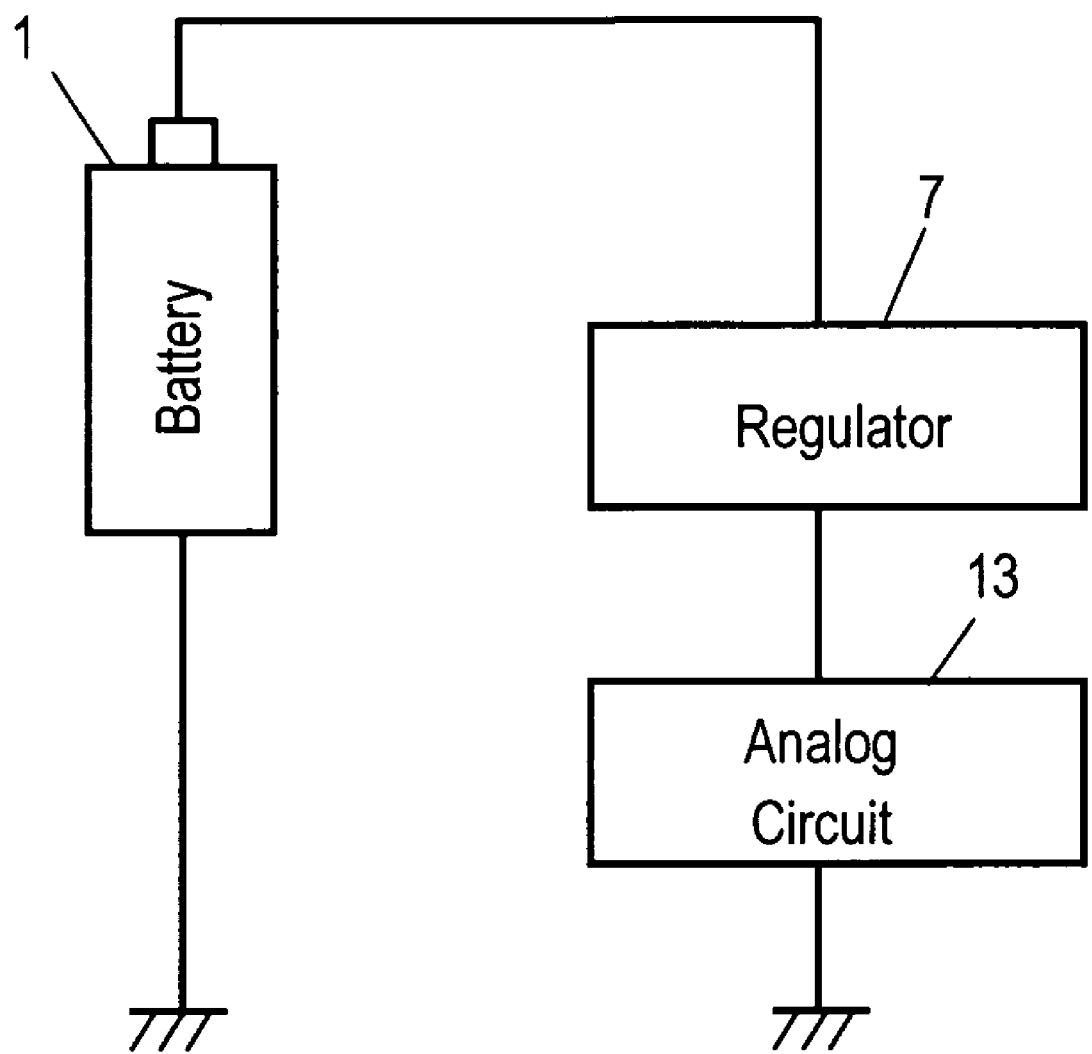
FIG. 10 is a circuit block diagram of an essential part of the conventional power supply apparatus shown in FIG. 9.

When connecting common port 27A of branching switch 27 to port 27B, switch controller 35 turns off switch 30 and turns on switch 32. When connecting common port 27A of branching switch 27 to port 27C, switch controller 35 turns off switch 32 and turns on switch 30. Specifically, common port 27A of branching switch 27 is not connected electrically with port 30B of switch 30, and common port 27A of branching switch 27 is not connected electrically with port 32B of switch 32. Thus, output port 25B of DC-DC converter 25 is always prevented from being connected directly to output terminal 31. This prevents output terminal 31 from receiving noises even when an output from DC-DC converter 25 includes the noises. Thus, filter 8 for reducing noises in conventional power supply apparatus 3 shown in FIG. 9 can be eliminated, thus allowing power supply apparatus 23 according to the embodiment to have a small size and to be inexpensive.

Capacitors 28 and 29 are charged and discharged according to the on-time/off-time (duty) ratio of the control signal input to control-signal-input terminal 34. Thus, the duty ratio of the control signal is preferably identical to the ratio of the capacitances of capacitors 28 and 29. According to Embodiment 1, the duty ratio of the control signal is about 50%, that is, the on-time is equal to the off-time. Thus, the capacitances of capacitors 28 and 29 are identical to each other.

Output port 25B of DC-DC converter 25 is directly connected to output terminal 26. Output terminal 26 is connected to logic circuit section 36 which is not influenced relatively by noise, thus providing power saving. In particular, the power wasted by regulators 7 and 10 of conventional power supply apparatus 1 shown in FIG. 9 can be eliminated.

According to Embodiment 1, battery 21 has an internal resistor therein. DC-DC converter 25 drops a voltage of 3.6V at input port 25A to a voltage of 1.2V at output port 25B. According to Embodiment 1, DC-DC converter 25 has a conversion efficiency of about 85%. Even under consideration of this conversion efficiency, a current flowing out from output port 25B of DC-DC converter 25 is smaller than a current flowing into input port 25A. Since a power increases in proportion to a square of a flowing current, the internal resistor of battery 21 consumes a small power, accordingly reducing heat generation by battery 21.

Figure 2:
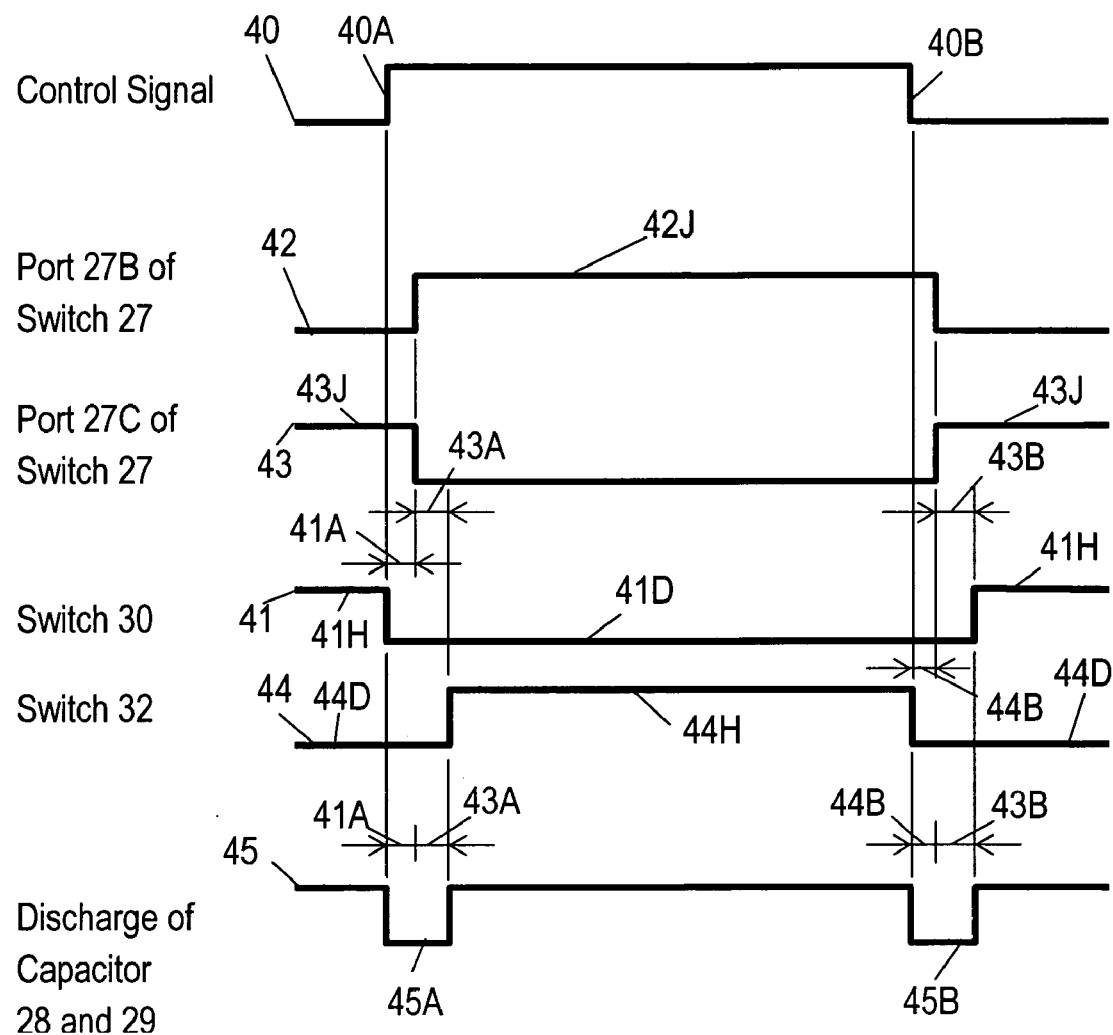
FIG. 2 is a timing chart of a ripple-removing circuit of the power supply apparatus according to Embodiment 1.

Branching switch 27, switches 30 and 32, capacitors 28, 29 and 33, and switch controller 35 constitute ripple-removing circuit 38. An operation of ripple-removing circuit 38 will be described. FIG. 2 is a timing chart of the control signal input to control-signal-input terminal 34 and operations of branching switch 27 and switches 30 and 32.

In FIG. 2, control signal 40 is input to control-signal-input terminal 34 and has an on-time of 0.5 ms and an off-time of 0.5 ms, thus having the on-time/off-time ratio of 1:1. Waveform 41 illustrates the status of switch 30. Waveforms 42 and 43 illustrate the statuses of ports 27B and 27C of branching switch 27, respectively. Waveform 44 illustrates the status of switch 32. When control signal 40 is input to ripple-removing circuit 38, switch controller 35 controls switches 27, 30, and 32 as follows. Switch controller 35 turns off switch 30 at time point 40A of a rising edge of control signal 40, as shown by waveform 41. Switch controller 35 connects port 27B of branching switch 27 to common port 27A and disconnects port 27C from common port 27A after period 41A of time from time point 40A, as shown by waveforms 42 and 43. After period 43A of time from this moment, switch controller 35 turns on switch 32, as shown by waveform 44.

At time point 40B which is after 0.5 ms from time point 40A, control signal 40 changes. Switch controller 35 turns off switch 32 at time point 40B, as shown by waveform 44. Switch controller 35 disconnects port 27B of branching switch 27 from common port 27A, and connects port 27C to common port 27A after period 44B of time from time point 40B, as shown waveforms 42 and 43. After period 43B of time from this moment, switch controller 35 turns on switch 30, as shown by waveform 41. The above operations are repeated every time when control signal 40 changes between an on-status and an off-status.

Capacitor 28 is charged while switch controller 35 connects port 27B of branching switch 27 to common port 27A during period 42J of time. Capacitor 28 is charged while switch controller 35 connects port 27C of branching switch 27 to common port 27A during period 43J of time.

Switch 30 is turned on during period 41H of time as to discharge an electric charge in capacitor 28 to output terminal 31 during period 41H of time. Switch 32 is turned on during period 44H of time as to discharge an electric charge in capacitor 29 to output terminal 31 during period 44H of time. Thus, switch controller 35 does not connects ports 27B and 27C of branching switch 27 simultaneously to common port 27A, as shown by waveforms 41 and 44, hence charging capacitor 28 and capacitor 29 alternately. Switch controller 35 does not simultaneously turns on switches 30 and 32, hence discharging the electric charges in capacitors 28 and 29 alternately.

Switch controller 35 turns off switch 30 of port 27B during period 41D of time to prevent output port 25B of DC-DC converter 25 from being connected to output terminal 31 during period 42J of time while switch controller 35 connects port 27B of branching switch 27 to common port 27A and disconnects port 27C from common port 27A.

Similarly, switch controller 35 turns off switch 32 connected to port 27C during period 44D of time to prevent output port 25B of DC-DC converter 25 from connected to output terminal 31 during period 43J of time while switch controller 35 connects port 27C of branching switch 27 to common port 27A and disconnects port 27B from common port 27A The above operation prevents, even if output port 25B of DC-DC converter 25 includes noises, the noises from being introduced directly to output terminal 31 and from being output.

Waveform 45 shows the status of the discharging of capacitors 28 and 29. Capacitors 28 and 29 are not discharged during periods 45A and 45B, that is, the discharge of capacitors 28 and 29 is not performed continuously. Capacitors 28 and 29 do not supply a current to output terminal 31 during period 45A or 45B. During periods 45A and 45B, capacitor 33 continuously supplies a current to output terminal 31. Capacitor 33 is charged during the discharge of capacitors 28 and 29, and is discharged during periods 45A and 45B to continuously supply a power from output terminal 31.

Exemplary Embodiment 2

Figure 3:
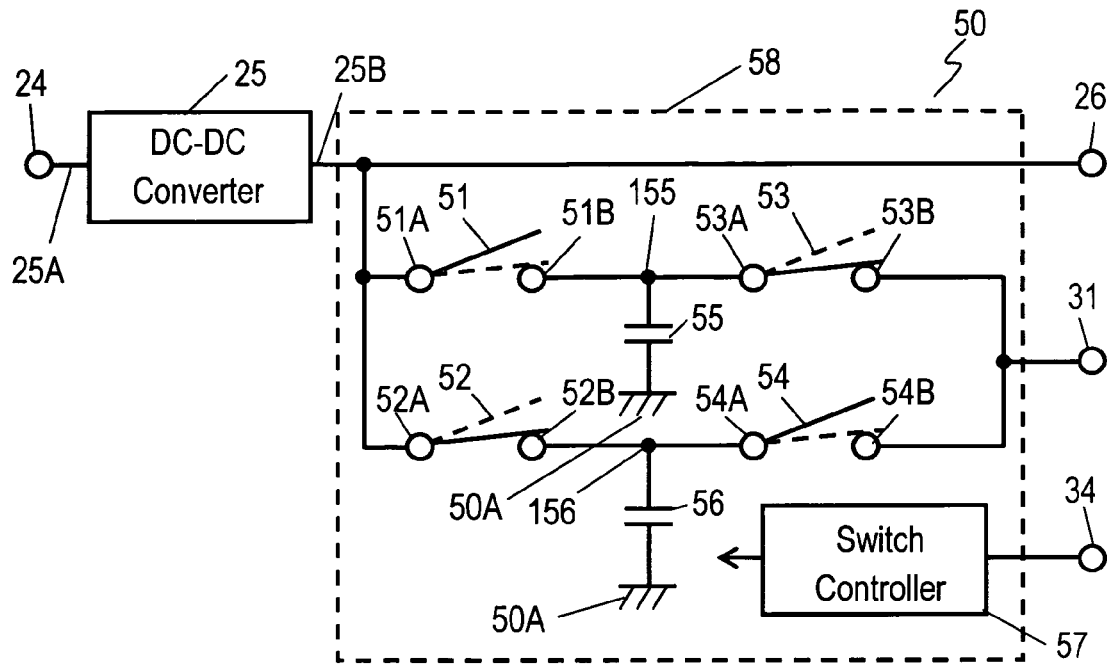
FIG. 3 is a circuit block diagram of a power supply apparatus according to Exemplary Embodiment 2 of the invention.

FIG. 3 is a block diagram of power supply apparatus 50 according to Exemplary Embodiment 2. Power supply apparatus 50 includes switches 51 to 54 instead of branching switch 27 and switches 30 and 32 of power supply apparatus 23 shown in FIG. 1 according to Embodiment 1. In FIG. 3, the same components as those shown in FIG. 1 are denoted by the same reference numerals, and their description will not be omitted.

Input terminal 24 of power supply apparatus 50 is connected to input port 25A of DC-DC converter 25. Output port 25B of DC-DC converter 25 is connected directly to output terminal 26 and is connected to ports 51A and 52A of switches 51 and 52, respectively. Port 51B of switch 51 is connected to port 53A of switch 53. Port 52B of switch 52 is connected to port 54A of switch 54. Ports 53B and 54B of switches 53 and 54 are connected to output terminal 31, respectively.

Port 51B of switch 51 is connected to port 53A of switch 53 at node 155. Capacitor 55 is connected between node 155 and ground 50A. Capacitor 55 functions similarly to capacitor 28 shown in FIG. 1 according to Embodiment 1, and has a capacitance of 100 µF. Port 52B of switch 52 is connected with port 54A of switch 54 at node 156. Capacitor 56 is connected between node 156 and ground 50A. Capacitor 56 functions similarly to capacitor 29 shown in FIG. 1 according to Embodiment 1, and has a capacitance of 100 µF. In power supply apparatus 50 according to Embodiment 2, capacitor 33 shown in FIG. 1 is not connected between output terminal 31 and the ground, thus allowing power supply apparatus 50 to have a small size.

Control-signal-input terminal 34 which a control signal is input to is connected to switch controller 57. Switch controller 57 turns on and off switches 51 to 54. Switches 51 to 54, capacitors 55 and 56, and switch controller 57 provide ripple-removing circuit 58.

Figure 4:
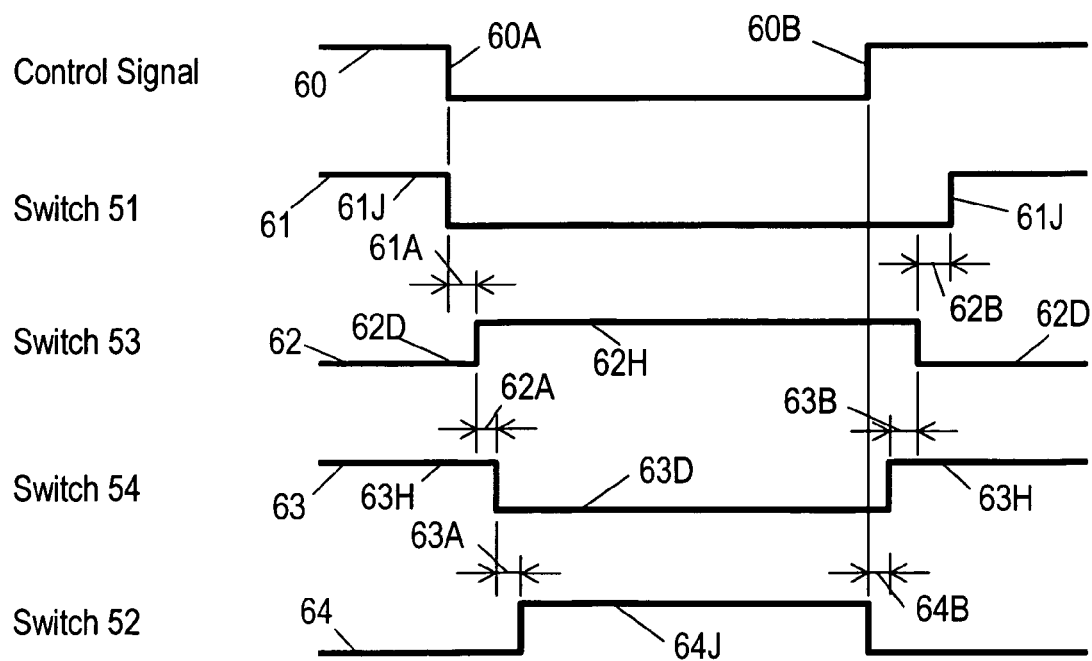
FIG. 4 is a timing chart of a ripple-removing circuit of the power supply apparatus according to Embodiment 2.

An operation of power supply apparatus 50 will be described below. FIG. 4 is a timing chart of the control signal input to control-signal-input terminal 34 and operations of switches 51 to 54. Control signal 60 is input to control-signal-input terminal 34 and has an on-time of 0.5 ms and an off-time of 0.5 ms, that is, has an on-time/off-time ratio of 1:1 (a duty ratio of 50%). Upon receiving control signal 60, switch controller 57 controls the switches as follows. Waveform 61 illustrates the status of switch 51. Waveform 62 illustrates the status of switch 53. Waveform 63 illustrates the status of switch 54. Waveform 64 illustrates the status of switch 52. Switch controller 57 turns off switch 51 at time point 60A of a rising edge of control signal 60, as shown by waveform 61. Switch controller 57 turns on switch 53 after period 61A of time from time point 60A, as shown by waveform 62. After period 62A of time from this moment, switch controller 57 turns off switch 54, as shown by waveform 63. After period 63A of time from this moment, switch controller 57 turns on switch 52, as shown by waveform 64.

Control signal 60 changes at time point 60B which is 0.5 ms after time point 60A. Switch controller 57 turns off switch 52 at time point 60B, as shown by waveform 64. Switch controller 57 turns on switch 54 after period 64B of time from time point 60B, as shown by waveform 63. After period 63B of time from this moment, switch controller 57 turns off switch 53, as shown by waveform 62. After period 62B of time from this moment, switch controller 57 turns on switch 51, as shown by waveform 61. These operations are repeated every time when control signal 60 changes.

Switch controller 57 turns off at least one of switches 52 and 54 while turning on switch 53. Switch controller 57 turns off at least one of switches 51 and 53 while turning on switch 54.

Switch controller 57 turns on switch 51 during period 61J of time to charge capacitor 55. Switch controller 57 turns on switch 52 during period 64J of time to charge capacitor 56.

Switch controller 57 turns on switch 53 during period 62H of time to discharge the electric charge in capacitor 55 to output terminal 31. Switch controller 57 turns on switch 54 during period 63H of time to discharge the electric charge in capacitor 56 to output terminal 31.

Thus, switch controller 57 selectively turns on switches 51 and 52 alternately, accordingly charging capacitor 55 and capacitor 56 alternately. Switch controller 57 alternately turns on switches 53 and 54, accordingly discharging the electric charge in capacitors 55 and 56 alternately.

While turning on switch 51 during period 61J of time, switch controller 57 turns off switch 53 during period 62D of time as to prevent output port 25B of DC-DC converter 25 from being connected to output terminal 31. Similarly, while turning on switch 52 during period 64J of time, switch controller 57 turns off switch 54 during period 63D of time as to prevent output port 25B of DC-DC converter 25 from being connected to output terminal 31. Thus, even if output port 25B of DC-DC converter 25 includes noises, the noises are prevented from being introduced directly to output terminal 31 to be output.

Both of capacitors 55 and 56 are discharged during period 62A of time in waveform 62 and during period 63B of time in waveform 63. That is, electric charges in capacitors 55 and 56 are continuously supplied to output terminal 31, thus not requiring capacitor 33 shown in FIG. 1 according to Embodiment 1.

Exemplary Embodiment 3

Figure 5:
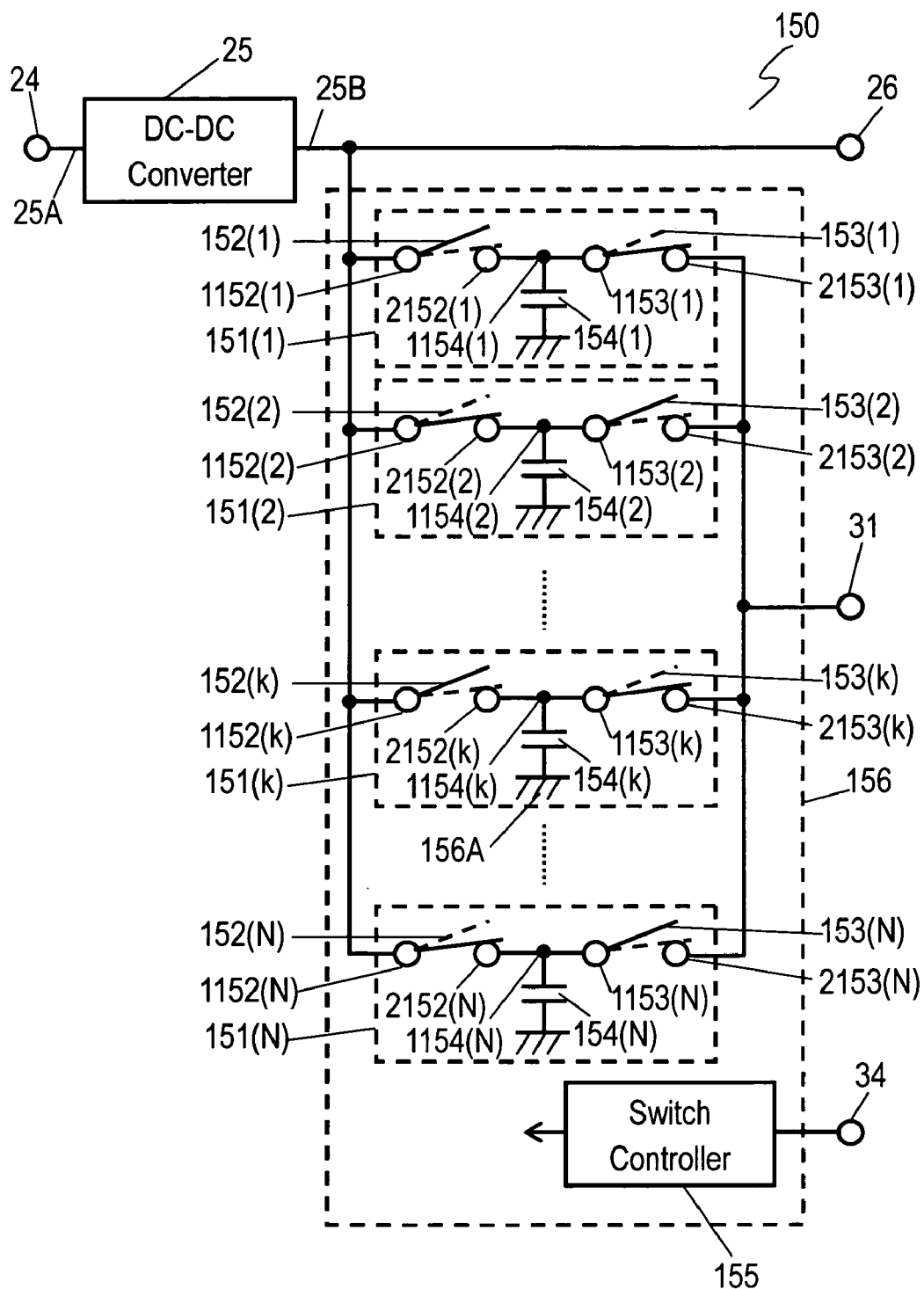
FIG. 5 is a circuit block diagram of a power supply apparatus according to Exemplary Embodiment 3 of the invention.

FIG. 5 is a block diagram of power supply apparatus 150 according to Exemplary Embodiment 3. Power supply apparatus 150 includes switches 152(1) to 152(N) and 153(1) to 153(N) instead of branching switch 27 and switches 30 and 32 of power supply apparatus 23 shown in FIG. 1 according to Embodiment 1. Power supply apparatus 150 further includes capacitors 154(1) to 154(N) instead of capacitors 28 and 29. Input terminal 24 of power supply apparatus 150 is connected to input port 25A of DC-DC converter 25. Output port 25B of DC-DC converter 25 is directly connected to output terminal 26. The number "N" of charge/discharge circuits 151(1) to 151(N) are connected in parallel with each other between output port 25B of DC-DC converter 25 and output terminal 31.

All charge/discharge circuits 151(1) to 151(N) have structures identical to each other. The k-th charge/discharge circuit 151($k$) ($1 \leq k \leq N$) out of the number "N" of charge/discharge circuits 151 includes switch 152($k$), switch 153($k$), and capacitor 154($k$). Port 1152($k$) of switch 152($k$) is connected to output port 25A of DC-DC converter 25. Port 2152($k$) of switch 152($k$) is connected to port 1153($k$) of switch 153($k$). Port 2152($k$) of switch 152($k$) is connected to port 1153($k$) of switch 153($k$) at node 1154($k$). Capacitor 154($k$) is connected between node 1154($k$) and ground 156A.

Capacitor 154($k$) functions similarly to capacitors 28 and 29 shown in FIG. 1 according to Embodiment 1, and has a capacitance of 100 μF. In power supply apparatus 150 according to Embodiment 3, capacitor 33 shown in FIG. 1 is not connected between output terminal 31 and the ground, accordingly allowing power supply apparatus 150 to have a small size.

Control-signal-input terminal 34 which a control signal is input to is connected to switch controller 155. Switch controller 155 controls the turning on and off of switches 152(1) to 152(N) and 153(1) to 153(N). Charge/discharge circuits 151(1) to 151(N) and switch controller 155 provide ripple-removing circuit 156.

An operation of power supply apparatus 150 will be described. Switch controller 155 controls switch 152($k$) and switch 153($k$) so as not to simultaneously turn on switch 152($k$) and switch 153($k$). That is, while turning on switch 153($k$), switch controller 155 turns off switch 152($k$). While turning off switch 153($k$), switch controller 155 turns on switch 152($k$). This operation prevents output port 25B of DC-DC converter 25 from being connected to output terminal 31. Even if output port 25B of DC-DC converter 25 includes noises, the noises are prevented from being output to output terminal 31.

Switch 152($k$) is turned on, and switch 153($k$) is turned off as to charge capacitor 153($k$). Switch 152($k$) is turned off, and switch 153($k$) is turned on as to discharge capacitor 153($k$).

In ripple-removing circuit 156, the number "N" of charge/discharge circuits 151(1) to 151(N) are divided to two groups: a group of charge/discharge circuits 151(1), . . . , 151($k$1), . . . , 151(N−1); and another group of charge/discharge circuits 151(2), . . . , 151($k$2), . . . , 151(N) (k1≠k2, $1 \leq k \leq N$, $1 \leq k2 \leq N$). Switch 152($k$1) operates at the same timing as that of switch 51 shown in FIG. 3. Switch 152($k$2) operates at the same timing as that of switch 52 shown in FIG. 3. Switch 153($k$1) operates at the same timing as that of switch 53 shown in FIG. 3. Switch 153($k$2) operates at the same timing as that of switch 54 shown in FIG. 3. The number of capacitors 154($k$1) and the number of capacitors 154($k$2), that is, the number of charge/discharge circuits 151(1), . . . , 151($k$1), . . . , 151(N−1) and the number of charge/discharge circuits 151(2), . . . , 151($k$2), . . . . 151(N) are determined according to the ratio of the period of time when switch 152($k$1) is turned on for charging capacitor 154($k$1) to the period of time when switch 152($k$2) is turned on for charging capacitor 154($k$2). Thus, even if these periods are different from each other, power supply apparatus 150 can supply a constant power to output terminal 31.

The number of switches 153(1) to 153(N) may be changed according to a load connected to output terminal 31.

Exemplary Embodiment 4

Figure 6:
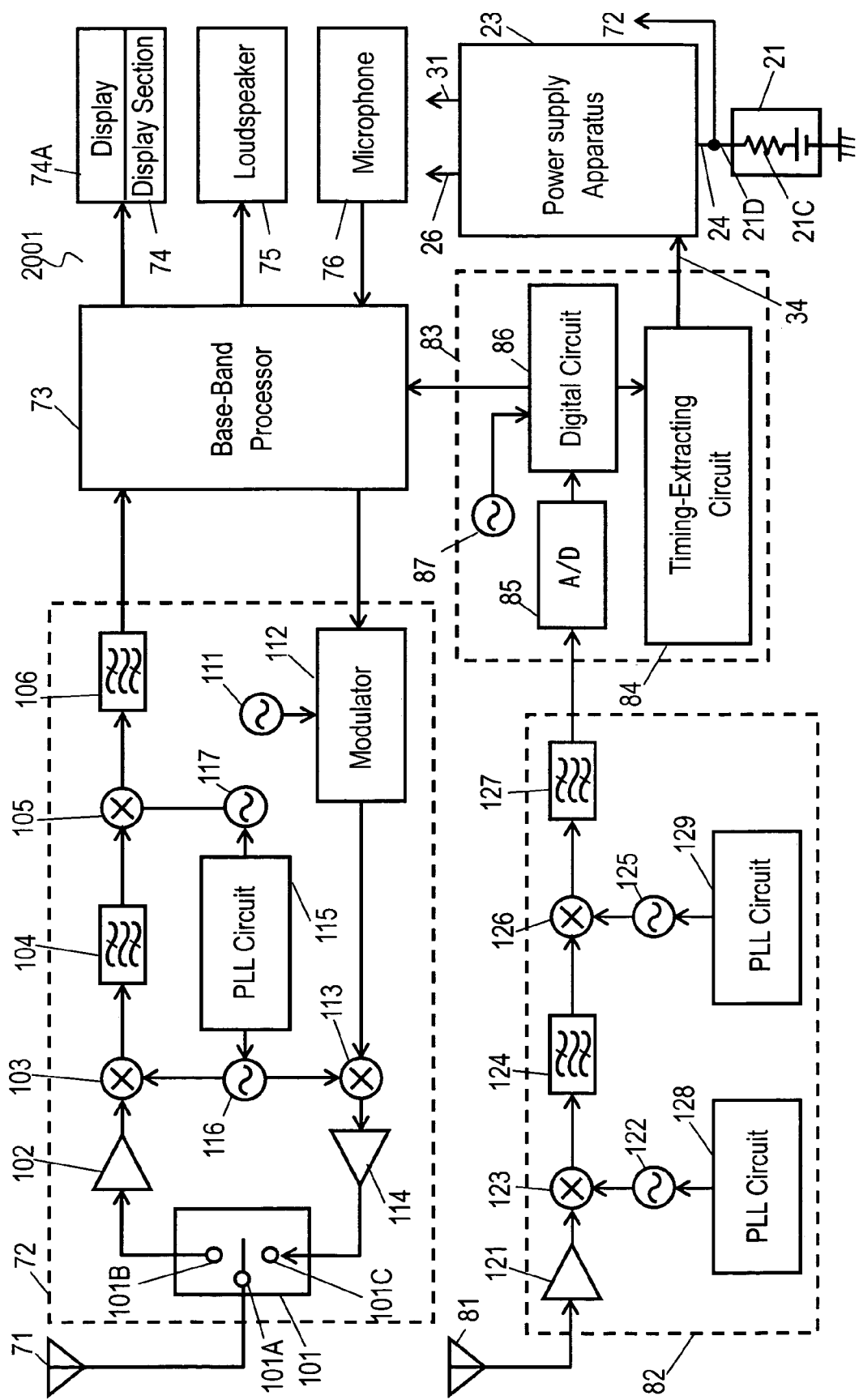
FIG. 6 is a circuit block diagram of an electronic device according to Exemplary Embodiment 4 of the invention.
Figure 7:
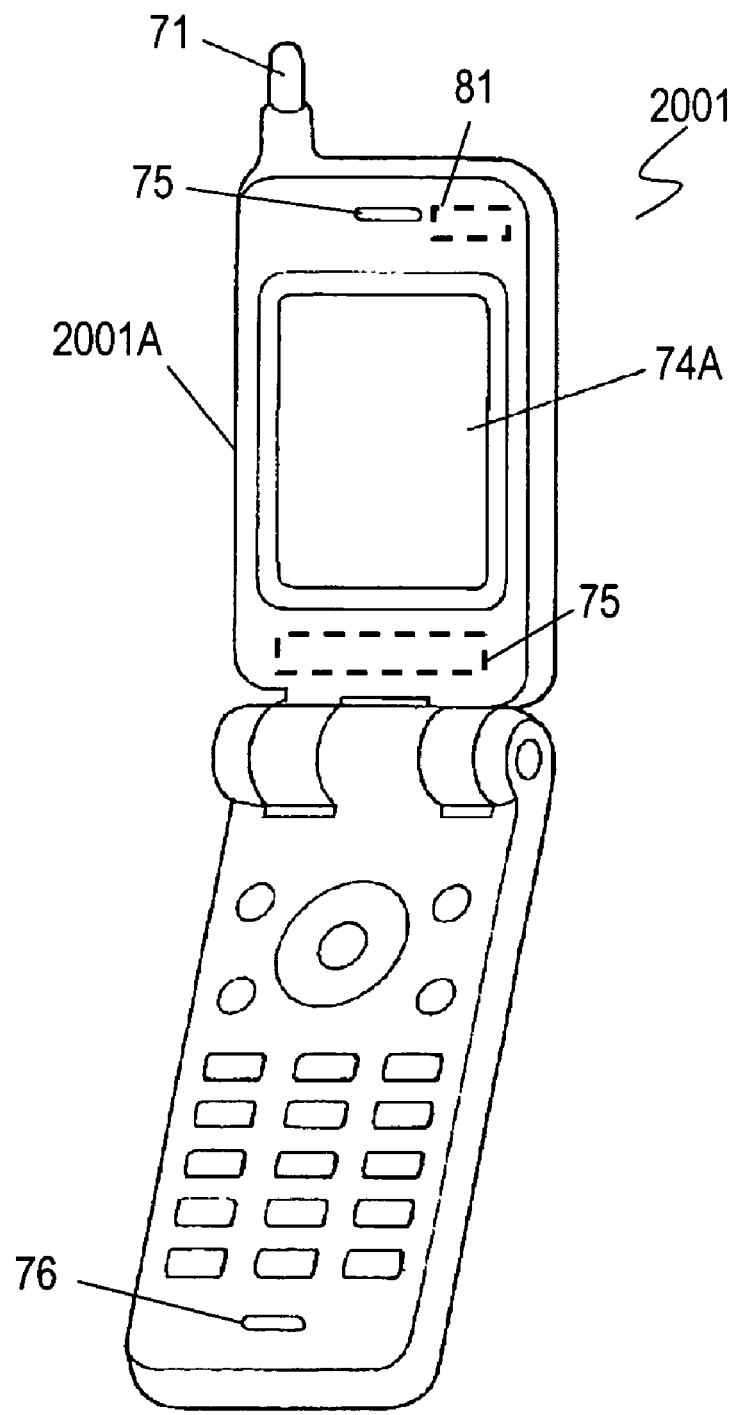
FIG. 7 is a perspective view of the electronic device according to Embodiment 4.

FIG. 6 is a block diagram of an electronic device, mobile phone 2001 with a television receiver, according to Exemplary Embodiment 4. FIG. 7 is a perspective view of mobile phone 2001. Antenna 71 is used for transmitting and receiving a telephone signal and is connected to transmitting/receiving section 72. Transmitting/receiving section 72 is connected to base-band processor 73. Base-band processor 73 is connected to display section 74, loudspeaker 75, and microphone 76. Display section 74 includes display 74A, such as a liquid crystal display element.

Antenna 81 which a digital television broadcast wave is input to is connected to television receiver 82. An output of television receiver 82 is connected via demodulator 83 to base-band processor 73. Demodulator 83 is connected to control-signal-input terminal 34 of power supply apparatus 23 according to Embodiment 1 shown in FIG. 1. Power supply apparatus 23 is connected to battery 21, a direct-current (DC) power supply. Power supply apparatus 23 may be power supply apparatus 50 or 150 according to Embodiment 2 or 3 shown in FIG. 3 or FIG. 5, respectively.

Transmitting/receiving section 72 includes a receiving system and a transmitting system.

The receiving system includes branching switch 101 connected to antenna 71, low-noise amplifier 102 connected to port 101B of branching switch 101, mixer 103 for mixing an output of low-noise amplifier 102 with an output of oscillator 116, intermediate-frequency (IF) filter 104 connected to an output of mixer 103, mixer 105 for mixing an output of IF filter 104 with an output of oscillator 117, and IF filter 106 connected between an output of mixer 105 and base-band processor 73. Branching switch 101 is implemented by an electronic switch. Antenna 71 is connected to common port 101A of branching switch 101. Common port 101A of branching switch 101 is connected selectively to port 101B and port 101C. Phase-locked-loop (PLL) circuit 115 is connected to oscillators 116 and 117.

The transmitting system includes modulator 112 for modulating an output of oscillator 111 with an output of base-band processor 73 to output it, mixer 113 for mixing the output of modulator 112 with an output of oscillator 116, and power amplifier 114 connected between an output of mixer 113 and port 101C of branching switch 101.

Television receiver 82 for receiving digital television broadcasting includes high-frequency amplifier 121 connected to antenna 81, mixer 123 for mixing an output of high-frequency amplifier 121 with an output of oscillator 122, IF filter 124 connected to an output of mixer 123, mixer 126 for mixing an output of IF filter 124 with an output of oscillator 125, IF filter 127 connected between the output of mixer 126 and an output of demodulator 83, PLL circuit 128 connected to oscillator 122, and PLL circuit 129 connected to oscillator 125.

Demodulator 83 includes A/D converter 85 connected to IF filter 127, oscillator 87, digital circuit 86 for processing an output of A/D converter 85 by using an output of oscillator 87, and timing-extracting circuit 84 connected to an output of digital circuit 86. An output of timing-extracting circuit 84 is connected to control-signal-input terminal 34 of power supply apparatus 23.

Battery 21 is connected to input terminal 24 of power supply apparatus 23 and supplies a power to transmitting/receiving section 72. Output terminal 26 of power supply apparatus 23 supplies a power to base-band processor 73 and digital circuit 86. Output terminal 31 of power supply apparatus 23 supplies a power to A/D converter 85, oscillator 87, and television receiver 82.

In transmitting/receiving section 72, power amplifier 114 requires a large power during transmitting. Battery 21 intermittently outputs the large power according to the activating and deactivating of power amplifier 114, accordingly causing internal resistance 21C of battery 21 to produce a ripple to be included in power line 21D.

Base-band processor 73 and digital circuit 86 are implemented by logic circuits including ICs operating with a low voltage, hence not being influenced relatively by noises, such as the ripple. Therefore, base-band processor 73 and digital circuit 86 are connected to output terminal 26 directly connected to output port 25B of DC-DC converter 25 having high conversion efficiency. This arrangement reduces a power consumed by mobile phone 2001.

Television receiver 82, A/D converter 85, and oscillator 87 are implemented by analog circuits, hence being influenced by noises, such as the ripple. Hence, television receiver 82, A/D converter 85, and oscillator 87 are connected to output terminal 31 of power supply apparatus 23 which has a reduced noise. Output terminal 31 supplies a power particularly to oscillators 122 and 125 in order to improve a carrier/noise ratio.

An operation of the electronic device, television mobile phone 2001, according to Embodiment 4 will be described.

A digital broadcast wave input to antenna 81 is selected by mixer 123, is demodulated by demodulator 83, and is output as a digital signal. The digital signal is processed by base-band processor 73, and then, display 74A of display section 74 displays an image based on the television broadcast wave.

Figure 8:
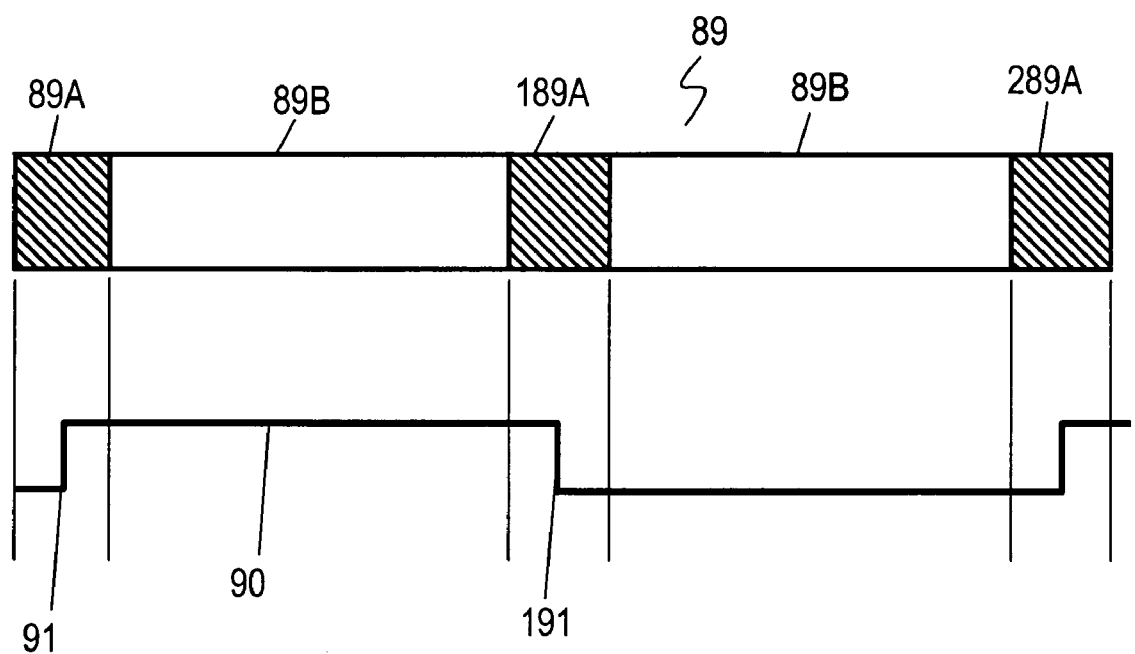
FIG. 8 illustrates a format of a guard interval signal of in the power supply apparatus according to Embodiment 4.

FIG. 8 schematically illustrates the digital broadcasting signal. Digital broadcasting signal 89 output from digital circuit 86 includes guard intervals 89A and 189A and valid code 89B. Guard intervals 89A and 189A are added before and after valid code 89B. Each of guard intervals 89 and 189A includes a duplicate of data of the valid code in a predetermined period from the end of the valid code in order to eliminate an interference among codes due to a delayed wave, such as a multi-path.

Timing-extracting circuit 84 shown in FIG. 6 extracts timings of guard intervals 89A and 189A in signal 89 output from digital circuit 86 to output control signal 90 based on the extracted timings guard intervals 89A and 189A. Switch controller 35 of power supply apparatus 23 controls branching switch 27, switch 30 or 32 based on the timings of guard intervals 89A and 189A. Control signal 90 rises at a predetermined time point, such as substantial center 91, in guard interval 89A and falls at substantial center 191 of guard interval 189A next to guard interval 89A. Timing-extracting circuit 84 activates switch 27, 30, and 32 of power supply apparatus 23 via control-signal-input terminal 34.

A valid code, such as video, is not transmitted in guard interval 89A or 189A. Thus, even if fluctuating, the power supplied from output terminal 31 to the analog circuits influenced easily by the noise does not distort the image on display 74A. Control signal 90 rises and falls at substantial centers 91 and 191 in guard intervals 89A and 189A, respectively. This timing prevents control signal 90 from rising and falling during valid code 89B even due to transmission delay in a multi-path environment. In the case that guard intervals 89A and 189A are used as a synchronizing signal, the activating of switch 27, 30, and 32 in guard intervals 89A and 189A may disturb the synchronization of the image. In order to avoid the disturbing of the synchronization of the image, control signal 90 of power supply apparatus 23 rises and falls alternately in guard intervals 89A and 189A. That is, control signal 90 rises in guard interval 89A and falls in guard interval 289A next to guard interval 189A. This arrangement allows guard interval signals 89A and 189A to still function as a synchronizing signal, thus preventing the synchronization of the image from being disturbed. The duration of valid code 89B is about 0.5 ms and the duration of each of guard intervals 89A and 189A is ¼, ⅛, 1/16 or 1/32 of the duration of valid code 89B.

The power supply apparatuses according to Embodiments 1 to 3 realize low power consumption and suppress noise generation and thus are useful for an electronic device such as a mobile device.

What is claimed is:

1. A power supply apparatus comprising:
   an input terminal arranged to be connected to a direct-current (DC) power supply;
   a DC-DC converter having an output port and an input port connected to the input terminal;
   a first capacitor;
   a second capacitor;
   a first output terminal;
   a first switch connected between the output port of the DC-DC converter;
   a second switch connected between the first capacitor and the first output terminal;
   a third switch connected between the output port of the DC-DC converter and the second capacitor;
   a fourth switch connected between the second capacitor and the first output terminal; and
   a switch controller operable to
      turn off the second switch while turning on the first switch as to charge the first capacitor, turn off the first switch while turning on the second switch as to discharge the first capacitor, turn off the fourth switch while turning on the third switch as to charge the second capacitor, turn off the third switch while turning on the fourth switch as to discharge the second capacitor, charge the first capacitor and the second capacitor alternately charged, discharge the first capacitor and the second capacitor alternately, turn off at least one of the third switch and the fourth switch while turning on the second switch, turn off at least one of the first switch and the second switch while turning on the fourth switch, and prevent the output port of the DC-DC converter from being connected to the first output terminal.

2. The power supply apparatus according to claim 1, further comprising a control-signal-input terminal which a control signal is input to, the control signal causing the switch controller to control the first to fourth switches, wherein the control signal has a ratio of an on-time to an off-time that is identical to a ratio of a capacitance of the first capacitor to a capacitance of the second capacitor.

3. The power supply apparatus according to claim 1, further comprising a second output terminal connected to the output port of the DC-DC converter.

4. The power supply apparatus according to claim 1, wherein the output port of the DC-DC converter has a voltage lower than a voltage of the input port of the DC-DC converter, and the DC power supply includes an internal resistance therein.

5. The power supply apparatus according to claim 1, further comprising:

a branching switch including a common port connected to the output port of the DC-DC converter, a first port connected to the first capacitor, and a second port connected to the second capacitor, the common port being connected selectively to the first port and the second port, the branching switch functioning as the first switch and the third switch; and a third capacitor connected between the first output terminal and a ground.

6. A power supply apparatus comprising:

an input terminal arranged to be connected to a direct-current (DC) power supply;

a DC-DC converter having an output port and an input port connected to the input terminal;

an output terminal;

a plurality of first charge/discharge circuits each including a first capacitor, a first switch connected between the output port of the DC-DC converter and the capacitor, and a second switch connected between the capacitor and the first output terminal;

a plurality of second charge/discharge circuits each including a second capacitor, a third switch connected between the output port of the DC-DC converter and the second capacitor; and a fourth switch connected between the second capacitor and the first output terminal; and a switch controller operable to turn off the second switch while turning on the first switch as to charge the first capacitor, turn off the first switch while turning on the second switch as to discharge the first capacitor, turn off the fourth switch while turning on the third switch as to charge the second capacitor, turn off the third switch while turning on the fourth switch as to discharge the second capacitor, charge the first capacitor and the second capacitor alternately charged, discharge the first capacitor and the second capacitor alternately, turn off at least one of the third switch and the fourth switch while turning on the second switch, turn off at least one of the first switch and the second switch while turning on the fourth switch, and prevent the output port of the DC-DC converter from being connected to the first output terminal.

7. The power supply apparatus according to claim 6, wherein the number of the first capacitor and the number of the second capacitor are determined based on a ratio of a period of time during which the first capacitor is charged by the first switch to a period of time during which the second capacitor is charged by the third switch.

8. A method of controlling a power supply apparatus, comprising:

providing a power supply apparatus which includes
an input terminal connected to a direct-current (DC) power supply,
a DC-DC converter having an output port and an input port connected to the input terminal,
a first capacitor,
a second capacitor,
an output terminal,
a first switch connected between the output port of the DC-DC converter and the first capacitor,
a second switch connected between the first capacitor and the output terminal,
a third switch connected between the output port of the DC-DC converter and the second capacitor, and
a fourth switch connected between the second capacitor and the output terminal;

turning off the first switch;

after said turning off the first switch, discharging the first capacitor by turning on the second switch;

after said discharging the first capacitor by turning on the second switch, turning off the fourth switch;

after said turning off the fourth switch, charging the second capacitor by turning on the third switch;

after said charging the second capacitor by turning on the third switch, turning off the third switch;

after said turning off the third switch, discharging the second capacitor by turning on the fourth switch; and after said discharging the second capacitor by turning on the fourth switch, turning off the second switch; and after said turning off the second switch, charging the first capacitor by turning on the first switch.

9. A method of controlling a power supply apparatus, comprising:

providing a power supply apparatus which includes
an input terminal connected to a direct-current (DC) power supply,
a DC-DC converter having an output port and an input port connected to the input terminal,
a first capacitor,
a second capacitor,
an output terminal,
a branching switch including a common port connected to the output port of the DC-DC converter, a first port connected to the first capacitor; and a second port connected to the second capacitor, the common port being connected selectively to the first port and the second port, a first switch connected between the first capacitor and the output terminal, a second switch connected between the second capacitor and the output terminal, and a third capacitor connected between the output terminal and a ground;

turning off the first switch;

after said turning off the first switch, charging the first capacitor by connecting the common port to the first port of the branching switch;

after said charging the first capacitor by connecting the common port to the first port of the branching switch, discharging the second capacitor by turning on the second switch;

after said discharging the second capacitor by turning on the second switch, turning off the second switch;

after said turning off the second switch, charging the second capacitor by connecting the common port to the second port of the branching switch; and after said charging the second capacitor by connecting the common port to the second port of the branching switch, discharging the first capacitor by turning on the first switch.

10. An electronic device comprising:

a power supply apparatus including an input terminal arranged to be connected to a direct-current (DC) power supply, a DC-DC converter having an output port and an input port connected to the input terminal, a first capacitor, a second capacitor, an output terminal, a first switch connected between the output port of the DC-DC converter, a second switch connected between the first capacitor and the output terminal, a third switch connected between the output port of the DC-DC converter and the second capacitor, a fourth switch connected between the second capacitor and the output terminal, a switch controller operable to control the first to fourth switches, and a control-signal-input terminal to which a control signal is input, the control signal causing the switch controller to control the first to fourth switches;

an antenna for receiving digital broadcasting;

an oscillator;

a mixer for mixing a signal from the antenna with an output of the oscillator;

a base-band processor for producing a digital signal and an image signal based on an output of the mixer, the digital signal including a valid code and a guard interval;

a display section for displaying the image signal; and a timing-extracting circuit for extracting a timing of the guard interval of the digital signal as to produce the control signal based on the extracted timing, wherein the switch controller is operable to turn off the second switch while turning on the first switch as to charge the first capacitor, turn off the first switch while turning on the second switch as to discharge the first capacitor, turn off the fourth switch while turning on the third switch as to charge the second capacitor, turn off the third switch while turning on the fourth switch as to discharge the second capacitor, charge the first capacitor and the second capacitor alternately charged, discharge the first capacitor and the second capacitor alternately, turn off at least one of the third switch and the fourth switch while turning on the second switch, turn off at least one of the first switch and the second switch while turning on the fourth switch, and prevent the output port of the DC-DC converter from being connected to the output terminal.

11. The electronic device according to claim 10, wherein the output terminal supplies a power to the oscillator.

12. The electronic device according to claim 10, wherein the timing-extracting circuit supplies, to the control signal input terminal, a signal for activating the first to fourth switches at a predetermined time point in the guard interval.

* * * * *

UNITED STATES PATENT AND TRADEMARK OFFICE
CERTIFICATE OF CORRECTION

PATENT NO. : 7,382,635 B2  
APPLICATION NO. : 11/519799  
DATED : June 3, 2008  
INVENTOR(S) : Masaaki Noda Page 1 of 1

It is certified that error appears in the above-identified patent and that said Letters Patent is hereby corrected as shown below:

In the Specification
Column 3, line 20, change the phrase "Capacitor 29" to read -- Capacitor 28 --.

In the Claims
Claim 1, line 58, change the phrase "DC-DC converter;" to read -- DC-DC converter and the first capacitor; --.

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,382,635 B2 Page 1 of 1
APPLICATION NO. : 11/519799
DATED : June 3, 2008
INVENTOR(S) : Masaaki Noda It is certified that error appears in the above-identified patent and that said Letters Patent is hereby corrected as shown below:

In the Specification
Column 3, line 20, change the phrase "Capacitor 29" to read -- Capacitor 28 --.

In the Claims
Column 10, Claim 1, line 58, change the phrase "DC-DC converter;" to read -- DC-DC converter and the first capacitor; --.

This certificate supersedes the Certificate of Correction issued December 22, 2009.

Signed and Sealed this

Twelfth Day of January, 2010

David J. Kappos
*Director of the United States Patent and Trademark Office*